United States Patent [19]

Grants et al.

[11] 4,070,702
[45] Jan. 24, 1978

[54] CONTACT HISTOGRAM FOR PROGRAMMABLE CONTROLLER

[75] Inventors: Valdis Grants, Lyndhurst; Odo J. Struger, Chagrin Falls, both of Ohio

[73] Assignee: Allan-Bradley Company, Milwaukee, Wis.

[21] Appl. No.: 671,020

[22] Filed: Mar. 26, 1976

[51] Int. Cl.² ............................................. G06F 11/00
[52] U.S. Cl. ...................................... 364/200; 364/900
[58] Field of Search ......................... 340/172.5; 445/1; 235/153 A, 151.1, 151.11; 364/200, 900

[56] References Cited

U.S. PATENT DOCUMENTS

| | | | |
|---|---|---|---|
| 3,522,597 | 8/1970 | Murphy | 235/153 A X |
| 3,701,113 | 10/1972 | Chace et al. | 340/172.5 |
| 3,771,144 | 11/1973 | Belady et al. | 340/172.5 |
| 3,818,458 | 6/1974 | Deese | 340/172.5 |
| 3,829,841 | 8/1974 | Steinberg | 340/172.5 |
| 3,868,648 | 2/1975 | Levin | 340/172.5 |
| 3,921,146 | 11/1975 | Danco | 340/172.5 |
| 3,939,453 | 2/1976 | Schroeder | 340/172.5 |
| 3,969,703 | 7/1976 | Kwiatkowski et al. | 340/172.5 |
| 3,971,920 | 7/1976 | Johnson | 340/172.5 X |
| 3,984,662 | 10/1976 | Sorenson | 340/172.5 X |

*Primary Examiner*—Melvin B. Chapnick
*Attorney, Agent, or Firm*—Quarles & Brady

[57] ABSTRACT

A controller programmer connects to a programmable controller and serves as a means for loading and editing the control program. When the contact histogram mode of operation is employed the logic state of a selected I/O device connected to the controller is monitored, and each time its status changes, its present status is recorded along with the time interval between status changes. A first embodiment is described in which the invention is employed in a hardwired controller program loader and a second embodiment is described in which the controller program loader employs a programmed microprocessor. In the first embodiment the status changes are recorded on paper tape and in the second embodiment they are recorded on a cathode ray tube screen.

12 Claims, 10 Drawing Figures

CONTACT HISTOGRAM

CONTACT HISTOGRAM FOR PROGRAMMABLE CONTROLLER

BACKGROUND OF THE INVENTION

The field of the invention is programmable controllers, and particularly, means for loading and editing programs for controllers such as that disclosed in U.s. Pat. No. 3,810,118 entitled "Programmable Matrix Controller" and that disclosed in U.S. Pat. No. 3,942,158 issued on Mar. 2, 1976 and entitled "Programmable Logic Controller".

Controllers such as those described in the above cited patents perform complex control jobs in accordance with a stored program. The stored program is a set of instructions which directs the controller to examine the condition of various sensing, or input devices such as switches and photoelectric cells, compare these conditions to the conditions specified in the stored program, and accordingly, direct the controller to energize or deenergize selected output devices such as motors, solenoids and lights. Although suitable programs may be developed and loaded directly into the controller, in practice such initial programs must first be used on the job site to correct unforeseen problems which inevitably occur. To this end, program loaders such as that disclosed in U.S. Pat. No. 3,798,612 entitled "Controller Programmer" and that disclosed in U.S. Pat. No. 3,813,649 entitled "Controller Program Editor" have been developed to facilitate the loading and editing of such programs. Such program loaders are separate instruments which are temporarily connected to the programmable controller to allow the entry and manipulation of the control program instructions. When the programmable controller has been successfully programmed and the controlled machine is operating properly, the program loader is disconnected therefrom and may be used to program another system.

Some of the numerous sensing and operating devices on the machine being controlled may be remotely located, or located in relatively inaccessible places. Often during the initial programming of the system, or later when troubleshooting malfunctions in the system, it is desirable to observe the operation of selected sensing devices or operating devices to ascertain whether or not they are operating properly

SUMMARY OF THE INVENTION

The present invention relates to an improved controller program loader which provides not only a visual indication of the present status of a device connected to the programmable controller, but also, a visual indication of the elapsed time between status changes. More specifically, the present invention includes means for periodically examining the status of an I/O device on the system controlled by a programmable controller, means for storing the status of the examined I/O device, timer means for recording the elapsed time when enabled, and means connected to the storage means for enabling the timer means when the stored status of the addressed I/O device changes state.

A general object of the invention is to provide a graphic history of the operation of a selected I/O device on the system being controlled. The controller program loader includes circuitry which employs the controller to monitor the status of the selected I/O device. Each time the monitored device changes logic state, the change in state is recorded along with the elapsed time. The record is maintained on a CRT display, digital printer, or other recording device which allows quick and easy examination of the operational history of the device.

Another object of the invention is to provide a contact histogram on a controller program loader which employes a microprocessor.

A more specific object of the invenion is to provide a means for recording the graphic history of a selected I/O device on a cathode ray tube display.

The foregoing and other objects and advantages of the invention will appear from the following description. In the description reference is made to the accompanying drawings which form a part hereof in which there is shown by way of illustration two embodiments of the invention. Such embodiments do not necessarily represent the full scope of the invention, but rather the invention may be employed in many different embodiments, and reference is made to the claims herein for interpreting the breadth of the invention.

DESCRIPTION OF THE PREFERRED EMBODIMENTS

There are a number of commercially available programmable controllers which operate to examine the condition of various input devices, compare these conditions to the conditions specified in the instructions of a stored program, and accordingly, energize or deenergize selected output devices. These controllers may vary in the number of input and output devices they can control and in the number of operations which they can be directed to perform. Despite these many variations, all controllers include a stored program which is comprised of a series of instructions that are repeatedly read out of a memory in sequence. Each instruction includes an operation code which determines the function to be performed by the controller and an I/O address code which determines the particular input or output device concerned.

Figure 1:
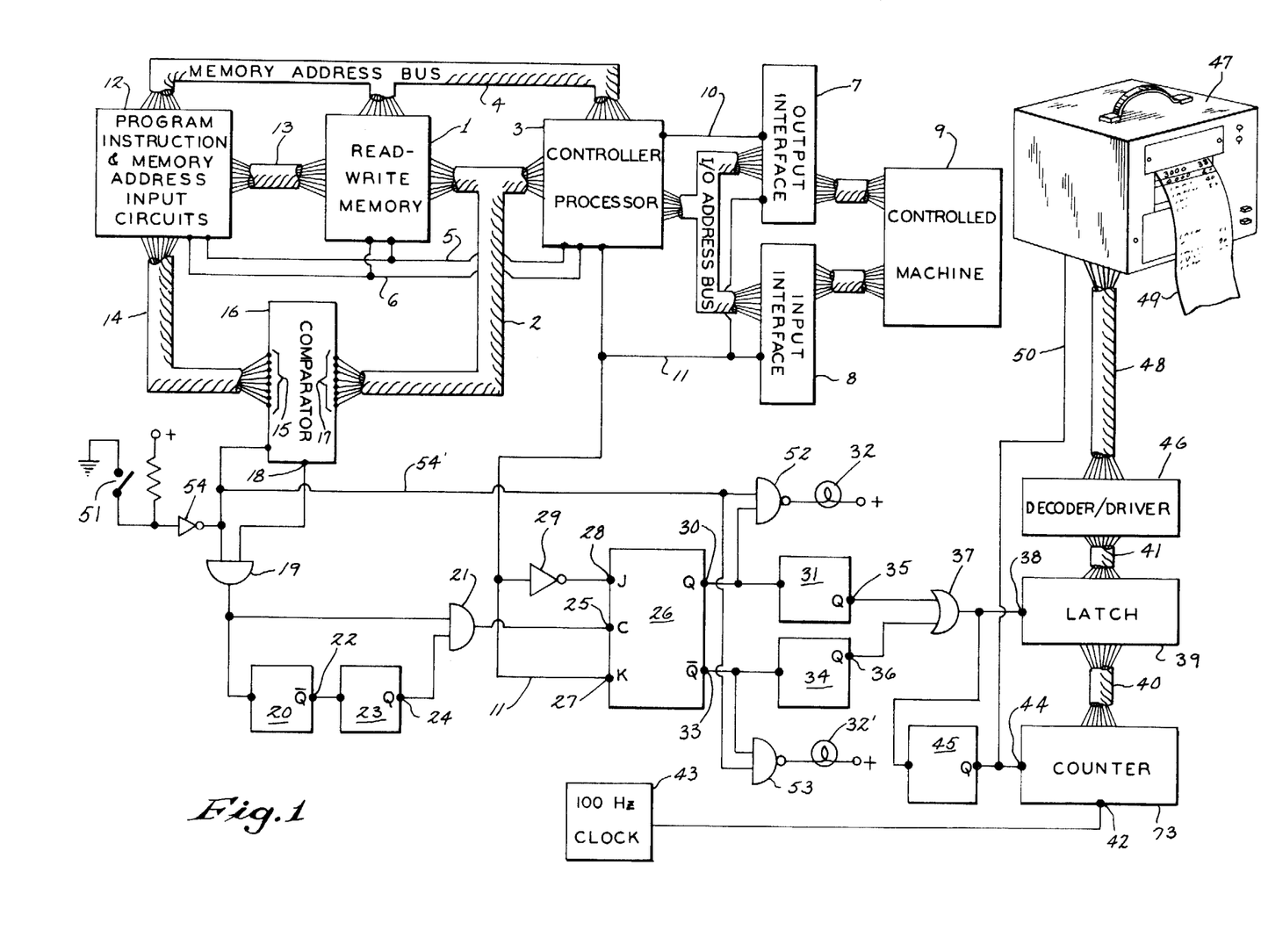
FIG. 1 is a schematic diagram of a controller program loader and associated programmable controller which incorporates the first preferred embodiment of the invention.

Referring particularly to FIG. 1, a ferrite core, read/write memory 1 stores the instructions which comprise the controller program. The memory 1 stores up to 1,024 eight-bit instructions which are sequentially read out through a memory data out bus 2 by a controller processor 3. Each instruction is separately addressed by a ten-bit address code applied through a memory address bus 4 and an addressed instruction is read from the read/write memory 1 by applying a logic low voltage to a read/write line 5 and a logic high voltage to a memory cycle line 6. As described in detail in the above cited U.S. Pat. No. 3,810,118 entitled "Programmable Matrix Controller", the controller processor 3 decodes the instructions read from the memory 1 and enables an output circuit on an output interface rack or an input circuit on an input interface rack 8 in response to an I/O address code in each instruction. The output interface rack 7 connects to operating devices on a controlled machine 9 and when a logic high voltage appears on a loic output bus 10, an addressed operating device is energized. Input interface rack 8 connects with sensing devices on the controlled machine, and when addressed by an instruction read and read/write memory 1, the status, or logic state, of the sensing device appears on a logic input bus 11. Thus, in response to the status of the sensing devices on the controlled machine 9 and in accordance with a control program stored in the read/write memory 1, the operating devices on the controlled machine 9 are selectively energized and deenergized.

In a manner similar to that described in the above cited U.S. Pat. No. 3,813,649 entitled "Controller Program Editor", the program loader of the first preferred embodiment of the invention makes use of the controller read/write memory 1 to develop the control program. It includes a program instruction and memory address input circuit 12 which connects to the memory address bus 4, the read/write line 5, memory cycle line 6 and a memory data input bus 13. Program instructions are manually selected and entered by means of the input circuit 12 into an addressed line of the memory 1. The input circuit 12 includes a set of four pushbuttons (not shown in the drawings) and an associated encoder circuit, and a set of three I/O address lever wheels (not shown in the drawings) and an associated encoder circuit. The lever wheels are commercially available electromechanical devices which each generate a three-bit binary number, and it is by means of these lever wheels that the I/O address portion of each program instruction is entered. A two-bit operation code is generated using the pushbuttons and is entered into the memory 1 with its associated six-bit I/O address code.

The six-bit address code generated by the lever wheels and the two-bit operation code generated by the pushbuttons are also applied to a cable 14 which connects to a first set of inputs 15 on an eight-bit comparator circuit 16. The comparator circuit 16 is comprised of two, cascade connected, commercially available four-bit magnitude comparators which are connected to compare an eight-bit instruction applied to its first input terminals 15 with an eight-bit program instruction applied to a second set of comparator input terminals 17 through the data out bus 2. Thus, a program instruction read from the read/write memory 1 may be compared with an instruction which is manually inserted at the circuit 12. When identity is found, a logic high voltage is generated at a comparator output terminal 18. For the purpose of the contact histogram mode of operation, however, a comparison is made only of the I/O address codes. Although considerable additional circuitry is contained in the controller programmer which relates to other modes of operation, this circuitry has been described in detail in the above cited U.S. Pat. No. 3,813,649, and only that which relates to the contact histogram mode of operation will now be described.

Referring particularly to FIG. 1, an input AND gate 19 has one input terminal connected to the comparator output terminal 18 and a second input terminal coupled to a mode select switch 51 through an inverter gate 54. The output of the inverter gate 54 serves as a contact histogram mode enable which is at a logic low voltage unless the switch 51 is closed. The output of the AND gate 19 connects to the input on a first monostable multivibrator 20 and to one input on a second AND gate 21. A $\overline{Q}$ output 22 on the monostable multivibrator 20 connects to an input on a second monostable multivibrator 23 and its Q output terminal 24 connects to a second input on the second AND gate 21. The output of the second AND gate 21 connects to a clock terminal 25 on a commercially available J-K type flip-flop 26. The logic input bus 11 on the programmable controller connects directly to a K input 27 on the flip-flop 26 and it connects to a J input 28 thereon through an inverter gate 29. A Q output terminal 30 on the J-K flip-flop 26 connects to the input of a third monostable multivibrator 31 and couples through a NAND gate 52 to an indicator light 32. A $\overline{Q}$ output terminal 33 on the J-K flip-flop 26 connects to the input on a fourth monostable multivibrator 34 and couples through a NAND gate 53 to a second indicator light 32'. The indicator lights 32 and 32' are enabled through a line 54' which connects the NAND gates 52 and 53 to the output of the inverter gate 54.

Q outputs 35 and 36 on the respective monostable multivibrators 31 and 34 connect to inputs on an OR gate 37 which has its output connected to the clock terminal 38 on a latch circuit 39. The latch circuit 39 is comprised of twenty-four D-type flip-flops having their clock terminals commonly connected to the terminal 38, their D inputs connected to respective leads in a cable 40, and their Q outputs connected to respective leads in a cable 41. The twenty-four leads in the cable 40 connect to outputs on a 24-bit BCD counter 73 which is comprised of six four-bit counters connected to generate a six-digit binary coded decimal number. The counter 73 includes an input terminal 42 which connects to the output of a 100Hz clock pulse generator 43, and a reset terminal 44 which couples to the output of the OR gate 37 through a fifth monostable multivibrator 45. The counter 73 is incremented by the clock 43, and together they serve as a timer which is advanced in ten millisecond increments.

The twenty-four leads in the cable 41 connect to a 24-bit decoder/driver circuit 46 which converts a six-digit binary coded decimal number stored in the latch 39 into a six-digit decimal number suitable for driving a digital printer 47 through a cable 48. The digital printer 47 is a commercially available printer such as the Model DP-650 sold under the trade name "Anadex" by the Anadex Instruments, Inc. of Van Nuys, California. The printer 47 records a six-decimal digit number on a paper strip 49 when a logic high voltage is applied to a print command line 50. The print command line 50 connects to the Q output on the fifth monostable multivibrator 45, and as will now be described in more detail, the print command line 50 is driven high each time a selected I/O device changes status, and as a result, the time between status changes is recorded on the paper strip 49.

When the controller programmer is in the contact histogram mode of operation, the controller processor 3 is allowed to function in its normal fashion to sequentially and continuously read the control program instructions from the read/write memory 1. The particular sensing device or operating device to be observed is selected by entering its I/O address through the lever wheels in the input circuit 12. The selected I/O address is thus applied through the cable 14 to the first set of inputs on the comparator circuit 16. The inverter gate 54 connects to the comparator 16 to disable the comparison of the operation codes in each instruction and, therefore, each time a program instruction having the same I/O address is read from the read/write memory 1, a logic high voltage is generated at the comparator output terminal 18. In response to the same program instruction, the controller processor 3 enables the input or output circuit associated with the selected I/O device on the controlled machine 9 and its logic state, or status, is thus concurrently generated on the logic input bus 11. The switch 51 is closed when the contact histogram mode of operation is selected and the logic high at the comparator output 18 is gated through the input AND gate 19 to one input of the second AND gate 21 and to the input of the first monostable multivibrator 20. A time delayed logic high voltage pulse is generated at the Q output 24 on the second monostable multivibrator 23 and is coupled through the second AND gate 21 and applied to the clock terminal 25 on the J-K flip-flop 26. As a result, the logic state of the logic input bus 11 is clocked into the flip-flop 26 to generate a logic high voltage at its Q output 30 if the selected I/O device is "closed", 37 energized", and to generate a logic high voltage at its $\overline{Q}$ output terminal 33 if the selected I/O device is "open", or "deenergized". One of the indicator lights 32 or 32' is thus illuminated to indicate the present status of the selected I/O device. The program instructions stored in the memory 1 are repeatedly read out and executed by the controller processor 3 at least once each ten milliseconds, and each time a program instruction containing the selected I/O address code is read out, the status of the corresponding I/O device is stored in the J-K flip-flop 26.

When the status of the selected I/O device changes, the state of the J-K flip-flop 26 is changed to reverse the status of the indicator lights 32 and 32'. In addition, a logic high voltage transition occurs at either the Q output 30 or the $\overline{Q}$ output 33 and a logic high voltage pulse is consequently generated by on of the monostable multivibrators 31 or 34. This pulse is coupled through the OR gate 37 to clock the latch circuit 39 and is coupled through the monostable multivibrator 45 to reset the counter 73 and generate a print command signal on the line 50. The elapsed time stored in the counter 73 is thus captured and stored in the latch circuit 39 and is coupled through the decoder/driver circuit 46 to the digital printer 47. The elapsed time is recorded on the paper strip 49 and the counter is reset to zero to commence timing the next interval. The cycle repeats each time the selected I/O device changes its status and the paper strip 49 thus contains a record of the time intervals between status changes.

Figure 2:
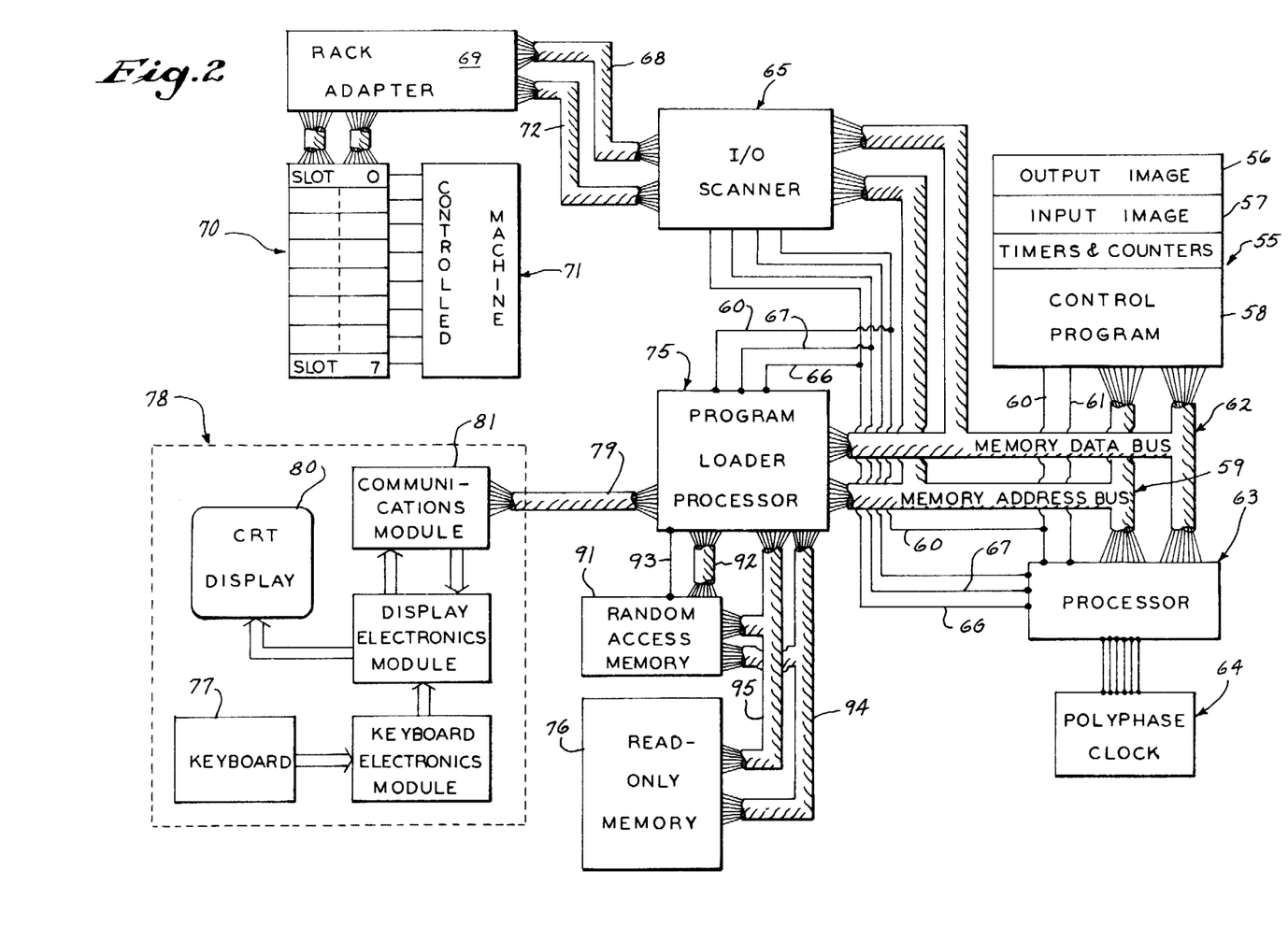
FIG. 2 is a block diagram of a controller program loader and associated programmable controller which incorporates the second preferred embodiment of the invention.

The second preferred embodiment of the invention is incorporated in a controller program loader for a programmable controller such as that disclosed in the above cited U.S. Pat. No. 3,942,158 entitled "Programmable Logic Controller". Referring particularly to FIG. 2, the programmable controller includes a random access read/write memory 55 which has an 18-bit word length and which includes from 2,048 to 8,192 separately addressable lines depending upon the size of the control program which it is to store. Two bits in each word stored in the memory 55 are used for parity checking, and thus, sixteen data bits are stored on each line of the memory 55. An output image table 56 is stored in the first sixty-four lines of the memory 55 and each line is separately addressable with the octal addresses 000–077. An input image table 57 is stored on the next sixty-four lines of the memory 55 and each line is separately addressable with the octal addresses 100–177. Preset and accumulated values of counters and timers are stored on the next 128 lines of the memory 55 and are addressable with the octal addresses 200–377, and the remaining lines of the memory 55 contain a control program 58 in which program instructions are contained and are separately addressable with octal addresses of 400 or greater.

Selected data is read from the memory 55 by applying the proper octal address to a memory address bus 59 and applying a logic low voltage to a read/write line 60. The memory 55 is cycled by applying a logic high pulse to a memory cycle ine 61 and the addressed word is read out on a memory data bus 62. A word is loaded, or written into a selected line of the memory 55 by applying the octal address of that line to the memory address but 59, applying a logic high voltage to the read/write line 60 and applying a logic high voltage pulse to the memory cycle line 61. The sixteen-bit data word appearing on the memory data bus 62 during the one-microsecond cycle time of the memory 55 is written into the selected line of the memory 55.

The control program 58 is executed by a controller processor 63 which connects to the memory buses 59 and 62 and to the control lines 60 and 61. In response to one-megahertz clock pulses generated by a polyphase clock 64, the controller processor 63 continuously and sequentially reads out the instructions of the control program 58 from the memory 55, and in response to an operation code contained within each program instruction, it performs the operation necessary to carry out the controller functions. Such operations include, for example, examining a status bit in the input image table 57 or setting a status bit in the output image table 56 to a desired state.

Each status bit in the output image table 56 corresponds with an operating device such as a motor starter or solenoid on a system being controlled, and each status bit in the input image table 57 corresponds with a sensing device such as a limit switch or a photoelectric cell on a controlled system. This correspondence is achieved by connecting all of the sensing and operating devices on the system being controlled to separately addressable input and output circuits on the programmable controller. Each status bit of the input image table 57 is periodically updated by coupling the status of the corresponding sensing device on the controlled system to the memory 55. This is performed by an I/O scanner circuit 65 which also periodically updates the status of the output devices on the controlled system by coupling the current state of each status bit in the output image table 56 to the programmable controller output circuits. The I/O scanner circuit 65 connects with the processor 63 through an interrupt line 66 and a grant line 67. The I/O scanner circuit 65 also connects directly to the memory data bus 62, the memory address bus 59, and the read/write line 60. The scanner circuit 65 periodically couples the memory data bus 62 to an I/O data bus 68 which connects to an interface rack which contains a rack adapter 69. The rack adapter 69 connects to eight separately addressable I/O slots 70, each of which includes sixteen addressable input or output circuits that connect to the operating and sensing devices on the controlled machine 71. An I/O address bus 72 connects the rack adapter 69 to the scanner circuit 65, and each rack adapter 69 includes decoding circuitry which is responsive to three bits in the six-bit address code on the bus 72 to enable the interface rack when its rack number is detected. Each rack adapter 69 also includes decoding circuitry which is operable to enable one of the slots 0–7 in response to the three remaining bits on the I/O address bus 72.

The I/O scanner circuit 65 periodically "steals" a memory cycle from the processor 63 to read a sixteen-bit word in the output image table 56 of the memory 55 and couple that word through the I/O data bus 68 to a selected rack and slot which is identified by an address on the I/O address bus 72. Also, the scanner circuit 65 periodically reads the status of sixteen input circuits in an addressed slot and couples the sixteen-bit data word to an addressed line in the input image table 57 of the memory 55. Thus, by periodically stealing a memory cycle from the processor 63, the I/O scanner circuit 65 updates the input image table 57 with the current status of the sensing devices on the controlled machine 71, and periodically updates the state of the operating devices on the controlled machine 71 by coupling the current status of the output image table 56 to the proper rack adapter 69.

The controller program loader interacts with the controller processor 63 and the read/write memory 55 on a similar "cycle steal" basis. Referring particularly to FIG. 2, the controller program loader includes a program loader processor 75 which connects to the memory address bus 59, the memory data bus 62, the interrupt line 66 and the grant line 67. As will be described in more detail hereinafter, the proram loader processor 75 operates in response to programs stored in a read-only memory 76 to load a cntrol program into the controller read/write memory 55 and to perform a number of editing functions on it. The control program instructions are entered through a keyboard 77 that forms part of a display terminal 78 and which connects to the program loader processor 75 through a cable 79. The display terminal 78 is a commercially available system such as the sold by TEC, Inc. under the trademark "Mini-Tec Data-Screen" and in addition to the keyboard 77, it includes a CRT display 80 and a communications module 81 which provides an EIA RS-232C compatible interface with the cable 79. Controller program instructions are entered through the keyboard 77 and coupled to the program loader processor 75 which converts them into the format disclosed in the above cited U.S. Pat. No. 3,942,158. After the conversion has been made, the program loader processor 75 interrupts the controller processor 63 for a one-microsecond memory cycle to load each program instruction into the control program portion 58, to load data into the output image table 56, or to load data into the input image table 57 of the read/write memory 55. The program loader processor 75 may also interrupt the controller processor 63 to read out a control program instruction or a 16-bit data word from the image tables 56 and 57 and convert them to a form suitable for operating the display 80.

Figure 3:
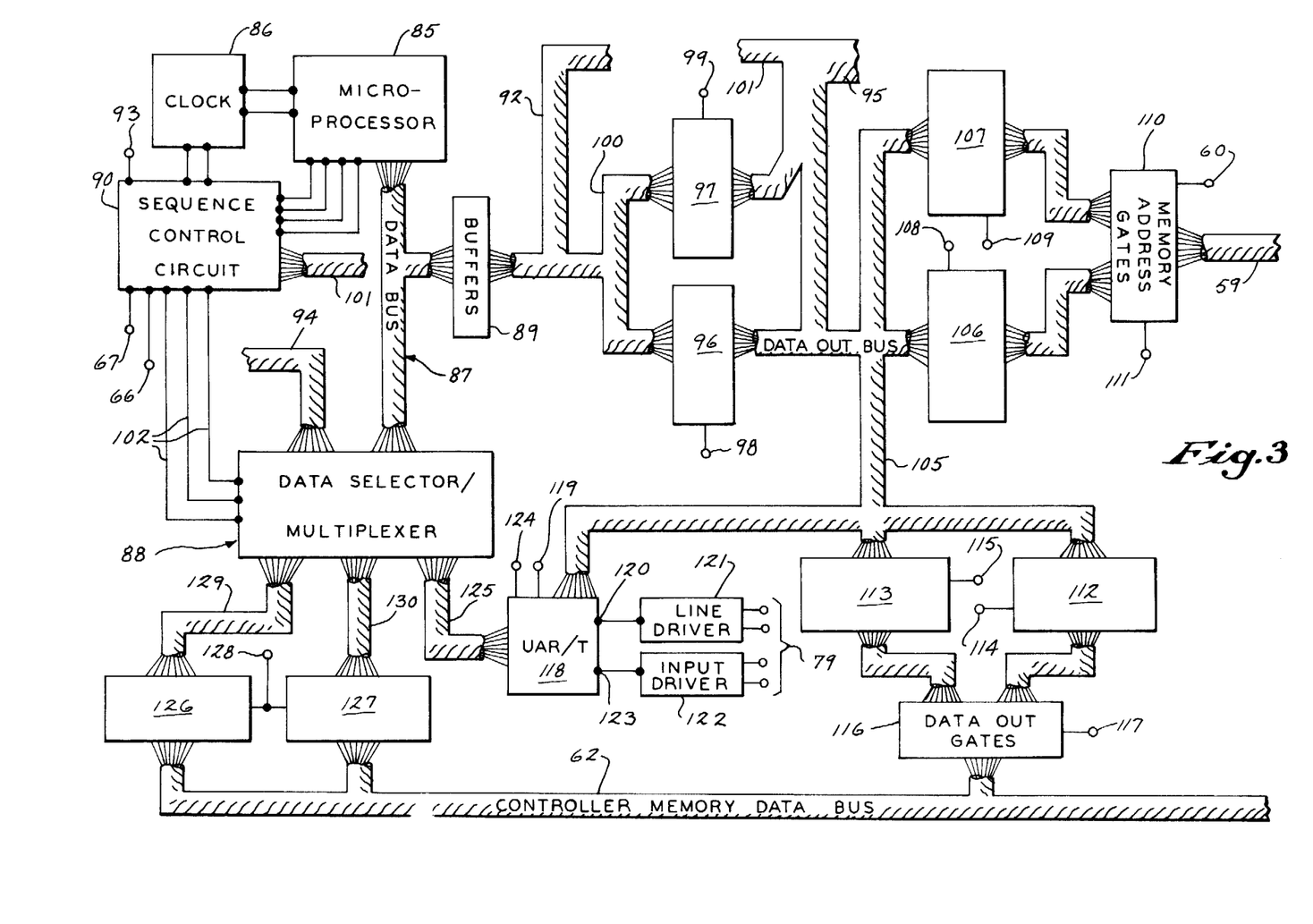
FIG. 3 is a schematic diagram of the program loader processor which forms part of the system of FIG. 2.

Referring particularly to FIGS. 2 and 3, the program loader processor 75 includes an eight-bit microprocessor 85 such as that sold commercially by the Intel Corporation as Model 8008. The microprocessor 85 is driven by a 500 kHz two-phase clock 86 and is connected through an eight-bit data bus 87 to a number of input and output ports. The input ports are coupled to the data bus 87 by an eight-port data selector/multiplexer 88 which is formed by sixteen parallel connected commercially available 4-line-to-1-line data selectors. The data bus 87 is coupled to the output ports through a set of eight buffers 89.

The microprocessor 85 controls the use of the data bus 87 and determines whether it will be conducting input or output data. Processor state signals $S_0$, $S_1$ and $S_2$, along with a timing signal, SYNC, inform the supporting circuitry of the state of the microprocessor. A table of the binary state signals and the designated state means is as follows:

| | MICROPROCESSOR | | |
|---|---|---|---|
| $S_0$ | $S_1$ | $S_2$ | STATE |
| 0 | 1 | 0 | P1 |
| 0 | 1 | 1 | INTERRUPT |
| 0 | 0 | 1 | P2 |
| 0 | 0 | 0 | WAIT |
| 1 | 0 | 0 | P3 |
| 1 | 1 | 0 | STOPPED |
| 1 | 1 | 1 | P4 |
| 1 | 0 | 1 | P5 |

These state signals and the SYNC signal are applied to a sequence control circuit 90 which operates the suporting circuitry now to be described. For a more detailed description of the microprocessor 85, including its capabilities, the manner in which it operates and the manner in which it interrelates with the supporting circuitry, reference is made to "8008 8 Bit Parallel Central Processor Unit Users Manual", published by the Intel Corporation on November, 1973.

Referring particularly to FIGS. 2 and 3, the buffers 89 connect to a random access memory (RAM) 91 through an eight-bit memory data out cable 92. The RAM 91 supplements the storage registers contained within the microprocessor 85 and is comprised of eight 64 bit memory chips arranged to store 64 separately addressable eight-bit words. An addressed word is read from the RAM 91 when a logic high voltage is applied to a read/write line 93 and a word is written into an addressed line when a logic low is applied to the line 93. Data read out of the RAM 91 is coupled through a memory data in cable 94 which connects to one of the eight-bit input ports on the multiplexer 88.

The memory data in cable 94 also connects to the read-only memory 76 to convey eight-bit data words read therefrom. The read-only memory 76 is comprised of thirty-eight ultraviolet light erasable programmable read-only memory chips (proms) such as Ser.No. 1702 sold commercially by the Intel Corporation. The read-only memory 76 provides storage for 9,728 eight-bit words. The memory 76 stores the control program for the controller program loader, the label "Contact Histogram" (stored on 17 lines with one ASCII charater per memory line), and a table of CRT cursor positions.

The memory lines in both the RAM 91 and the read-only memory 76 are separately addressable through a memory address cable 95. The eight least significant digit leads in the memory address cable 95 connect to the outputs of an eight-bit data latch 96 and the six most significant digit leads connect to six outputs on a second eight-bit data latch 97. The data latches 96 and 97 are each comprised of eight D-type flip-flops having their clock terminals commonly connected to respective clock lines 98 and 99 and their D inputs connected to respective outputs of the buffers 89 through a cable 100. The clock lines 98 and 99 connect to the sequence control circuit 90, and when a logic high is applied to either of them, an eight-bit word on the cable 100 is stored in the respective data latch 96 or 97.

The output terminals on the data latches 96 and 97 also connect to the sequence control circuit 90 through a cable 101. A code generated on the cable 101 indicates the function which is to be performed by the microprocessor supporting circuitry. For example, this code determines how the read/write line is to be controlled by the sequence control circuit 90. and it determines which input port is to be selected by operating the data selector 88 through three leads 102.

Connected to the eight output terminals on the data latch 96 is an eight-lead data out bus 105 which couples data from the microprocessor 85 to the controller memory address bus 59, the controller memory data bus 62, or the display terminal 78. More specifically, the data out bus 105 connects to eight input terminals on a first eight-bit controller address latch 106 and to the eight input terminals on a second eight-bit controller address latch 107. The latches 106 and 107 are each comprised of eight D-type flip-flops having their clock terminals commonly connected to the sequence control circuit 90 through respective leads 108 and 109. The Q output of each flip-flop in the address latches 106 and 107 connects to respective input terminals on fifteen memory address gates and one read/write gate 110. The gates 110 are NAND gates each having one input connected to a latch 107 or 106 and a second input commonly connected to the sequence control circuit 90 through an enable line 111. The output on each of fifteen of the NAND gates 110 connects to a lead in the controller memory address bus 59 and the output of the sixteenth NAND gate 110 connects to the controller read/write line 60.

The data out bus 105 also connects to the eight input terminals on a first controller data latch 112 and to eight input terminals on a second controller data latch 113. Each data latch 112 and 113 is comprised of eight D-type flip-flops having their clock terminals commonly connected to the sequence control circuit 90 through clock leads 114 and 115 and their Q outputs connected to respective inputs on sixteen data out gates 116. The data out gates 116 are NAND gates each having a second input commonly connected to the sequence control circuit 90 through an enable line 117 and an output terminal connected to respective leads in the controller memory data bus 62.

And finally, the data out bus 105 connects to eight parallel data input termials on a universal asynchronous receiver/transmitter (UAR/T) 118. The UAR/T 118 is a commercially available circuit such as the AY-5-1013 manufactured by the Microelectronics Division of The General Instrument Corporation which receives and stores the eight bits on the data out bus 105 when a logic high voltage is applied to a transmit strobe line 119. The strobe line 119 connects to the sequence control circuit 90 and when it is driven high, the eight bits of data on the bus 105 are transmitted serially through an output terminal 120 to a line driver 121. The line driver amplifies the digital output data to a form suitable for transmission on the cable 79 to the display terminal 78.

The UAR/T 118 also receives eight-bit bytes of serial data from the display terminal 78 through an input circuit 122 which connects to a serial data in terminal 123. The input circuit provides optical isolation and converts the digital signals received on the cable 79 to a logic level. When a logic high voltage appears on the receive line 124, the UAR/T 118 couples the eight-bit byte of serially received data to the data selector 88 through a cable 125.

The data/multiplexer 88 also receives data from the controller memory data bus 62 through two eight-bit input ports. A pair of eight-bit input data latches 126 and 127, each comprised of eight D-type flip-flops, connect to the sixteen leads in the controller memory data bus 62. The clock terminals on each flip-flop are commonly connected to the sequence control circuit 90 through a clock lead 128, and when a logic high voltage is applied thereto, a sixteen-bit data word is stored in the latches 126 and 127 and appears at the sixteen Q outputs. The eight Q outputs of the input data latch 126 are connected through an eight-lead bus 129 to one input port on the multiplexer 88 and the eight Q outputs on the input data latch 127 connect to a second input port through a bus 130.

The S0, S1, S2 and SYNC signals generated by the microprocessor 85 along with the $\phi1$ and $\phi2$ signals generated by the clocks 86 operate the sequence control circuit 90 to control the supporting circuitry. Referring particularly to the circuit diagram of the sequence control circuit 90 in FIG. 4, the S0, S1 and S2 signals are received at the a-c inputs of a four-bit BCD decoder 133. The BCD decoder 133 is a commercially available integrated circuit having its D input connected to signal ground and having a set of ten output terminals 134. A logic low voltage is generated at the fourth output terminal 134 during the P3 time period, at the sixth output terminal 134 during the P1 time period, and at the seventh output terminal 134 during the P2 time period. The outputs 134 couple through inverter gates 130 to generate logic high timing signals. The P3 timing signal is applied to one input on a first AND gate 135, to one input on a second AND gate 136 and to one input on a third AND gate 132. A second input on the AND gate 135 connects to receive the tenth digit from the data latch 97 through the cable 101, a second input on the AND gate 136 connects to receive the eleventh digit and a second input on the AND gate 132 connects to receive the twelfth digit. The outputs of the AND gates 135, 136 and 132 control the data selector/multiplexer 88 through the leads 102 by generating a three-bit binary coded number thereon which selects one of the eight input ports during the P3 time period.

Figure 4:
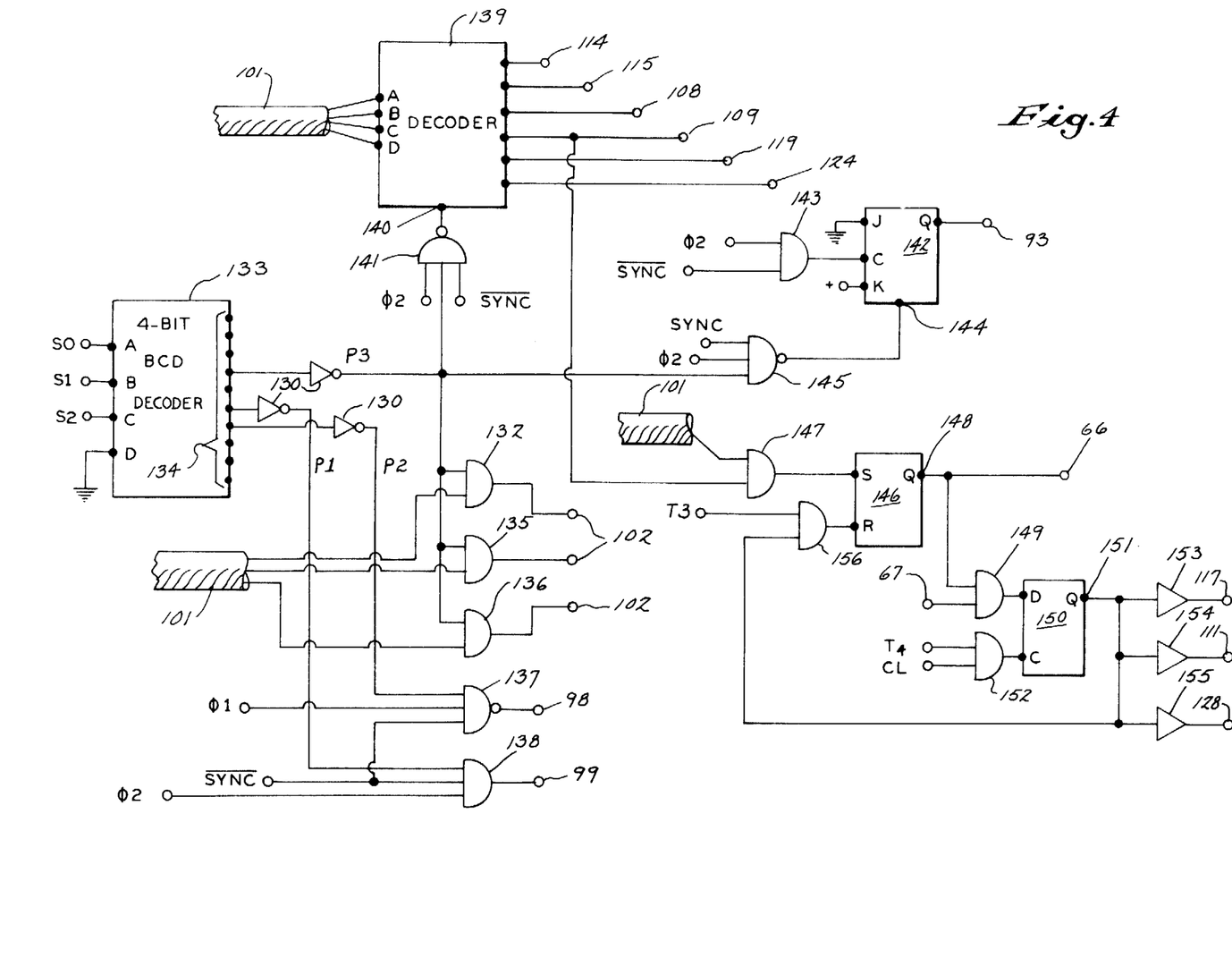
FIG. 4 is a schematic diagram of the sequence control circuit which forms part of the controller program loader of FIG. 3.
Figure 5:
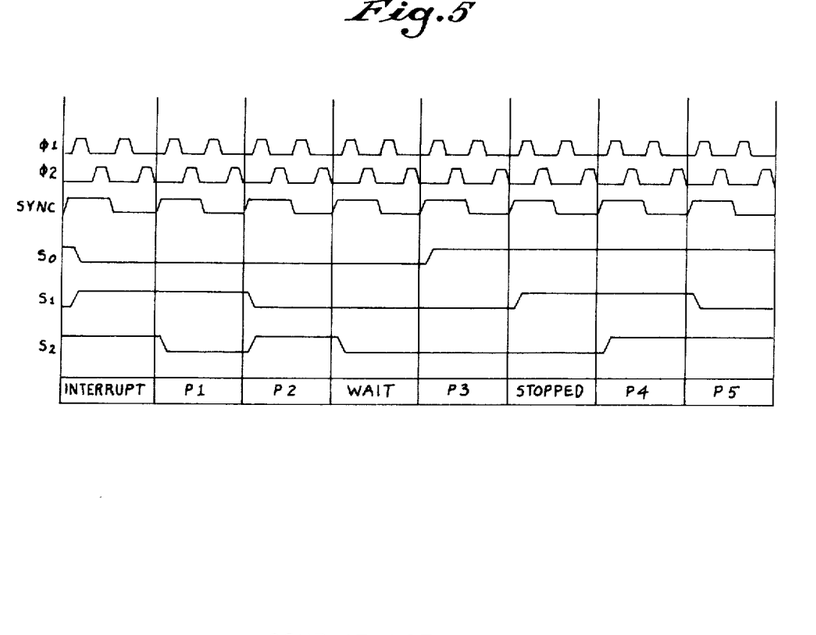
FIG. 5 is a timing diagram for the controller program loader of FIG. 3, FIGS. 6a and 6b are flow charts of the controller program loader executive routine stored in the read-only memory of FIG. 2, FIS. 7a and 7b are flow charts of the histogram routine which is called up by the executive routine of FIGS. 6a and 6b.

The P2 timing signal terminal 134 connects to one input on a NAND gate 137. A second input on the NAND gate 137 connects to receive the $\phi1$ timing signal from the clock 86 and a third input thereon connects to receive the $\overline{SYNC}$ timing signal from the microprocessor 85. Its output terminal controls the data latch 96 through the lead 98. The P1 timing signal terminal 134 connects to one input on an AND gate 138, a second input on the AND gate 138 connects to receive the $\phi2$ timing signal and a third input thereon connects to receive the $\overline{SYNC}$ timing signal. The output of the AND gate 138 controls the data latch 97 through the lead 99.

The controller data latches 112 and 113, the address latches 106 and 107, and the UAR/T 118 are controlled by a four-line-to-sixteen-line decoder 139. The decoder 139 is a commercially available integrated circuit having a set of inputs A-D connected respectively to receive the tenth, eleventh, twelfth and thirteenth digits through the cable 101. The decoder includes a set of sixteen output terminals, the first six of which connect to the respective leads 114, 115, 108, 109, 119 and 124 to control the above listed circuit elements. In response to the four-bit operation code applied to its inputs A-D, the decoder generates a logic low voltage at one of its sixteen output terminals when a logic low voltage is applied to a clock terminal 140. The clock terminal 140 is driven by a NAND gate 141 which has one input connected to receive the P3 timing signal, a second input connected to receive the $\phi2$ timing signal, and a third input connected to receive the $\overline{SYNC}$ timing signal.

The read/write line 93 which controls the RAM 91 is driven by a J-K flip-flop 142. The J input on the flip-flop 142 is connected to circuit ground and its clock terminal is driven by an AND gate 143. One input on the AND gate 143 connects to receive the $\phi2$ timing signal, and a second input thereon connects to receive the $\overline{SYNC}$ timing signal. A preset input terminal 144 on the J-K flip-flop 142 connects to the output of a NAND gate 145. One input on the NAND gate 145 connects to receive the P3 timing signal, a second input connects to receive the $\phi2$ timing signals, and a third input connects to receive the SYNC timing signal. In response to the logic state of these signals, the flip-flop 142 is set or reset during the P3 timing period to either read a word from the RAM 91 or write a word into it.

Direct access to the memory 55 of the programmable controller is initiated after a memory address has been loaded into the address latches 106 and 107. More specifically, an R-S flip-flop 146 has its set input connected to the output of an AND gate 147, which in turn has one input connected to receive the seventh digit in the cable 101 and a second input connected to the control line 109 which leads to the second address latch 107. The flip-flop 146 is set when an interrupt is to be requested and a logic high voltage is generated at its Q output 148 which connects to the controller interrupt line 66. The Q output 148 also connects to one input on an AND gate 149 which drives the D input on a D-type flip-flop 150. A second input on the AND gate 149 connects to the controller grant line 67 and when the interrupt is granted, the flip-flop 150 is set to generate a logic high voltage at its Q output terminal 151. The flip-flip 150 is clocked by T4 and C1 timing signals which are received from the programmable controller and applied to the C inpt through an AND gate 152. The resulting logic high generated at the Q output 151 during the one-microsecond interrupt is applied through buffers 153, 154 and 155 to the respective lines 117, 111 and 128 which control the data out gates 116, the memory address gates 110, and the input data latches 126 and 127. This logic high voltage is also coupled through an AND gate 156 to the reset terminal on the R-S flip-flop 146. The AND gate 156 is enabled by a T3 timing signal received from the programmable controller. For a more detailed description of the manner in which the one-microsecond interrupt is granted and terminated, reference is made to the above cited U.S. Pat. No. 3,942,158.

The function to be performed by the microprocessor's supporting circuitry is thus determined by instructions which are read out of the microprocessor 85 and stored in the data latches 96 and 97. Those instructions which relate to the contact histogram mode of operation are as follows:

| Input Instructions | | |
|---|---|---|
| Mnemonic | Bit Pattern | Comment |
| INP MEM | 01000001 | Read data from memories 76 and 91. |
| INP RECEV | 01000011 | Input data from UAR/T 118. |
| INP PLCLI | 01000101 | Input data from latch 126. |
| INP PLCLH | 01000111 | Input data from latch 127. |
| INP SUART | 01001111 | Received data present at UAR/T 118. |
| Output Instructions | | |
| Mnemonic | Bit Pattern | |
| OUT PLCLO | 01010001 | Load data in latch 112. |
| OUT PLCHO | 01010011 | Load data in latch 113. |
| OUT PLCLA | 01010101 | Load address in latch 106. |
| OUT PLCHA | 01010110 | Load address in latch 107. |
| OUT TRANS | 01011001 | TRANSMIT data from UAR/T 118. |
| OUT CLRDA | 01011011 | Acknowledge received data from UAR/T 118. |

As indicated previously, these instructions and the other instructions which comprise the controller programmer routines are stored in the read-only memory 76. The microprocessor 85 reads these instructions out of the memory 76 in the proper sequence and executes them. These routines will now be described with reference to the flow charts shown in FIGS. 6a, 6b, 7a and 7b.

Figure 6A:
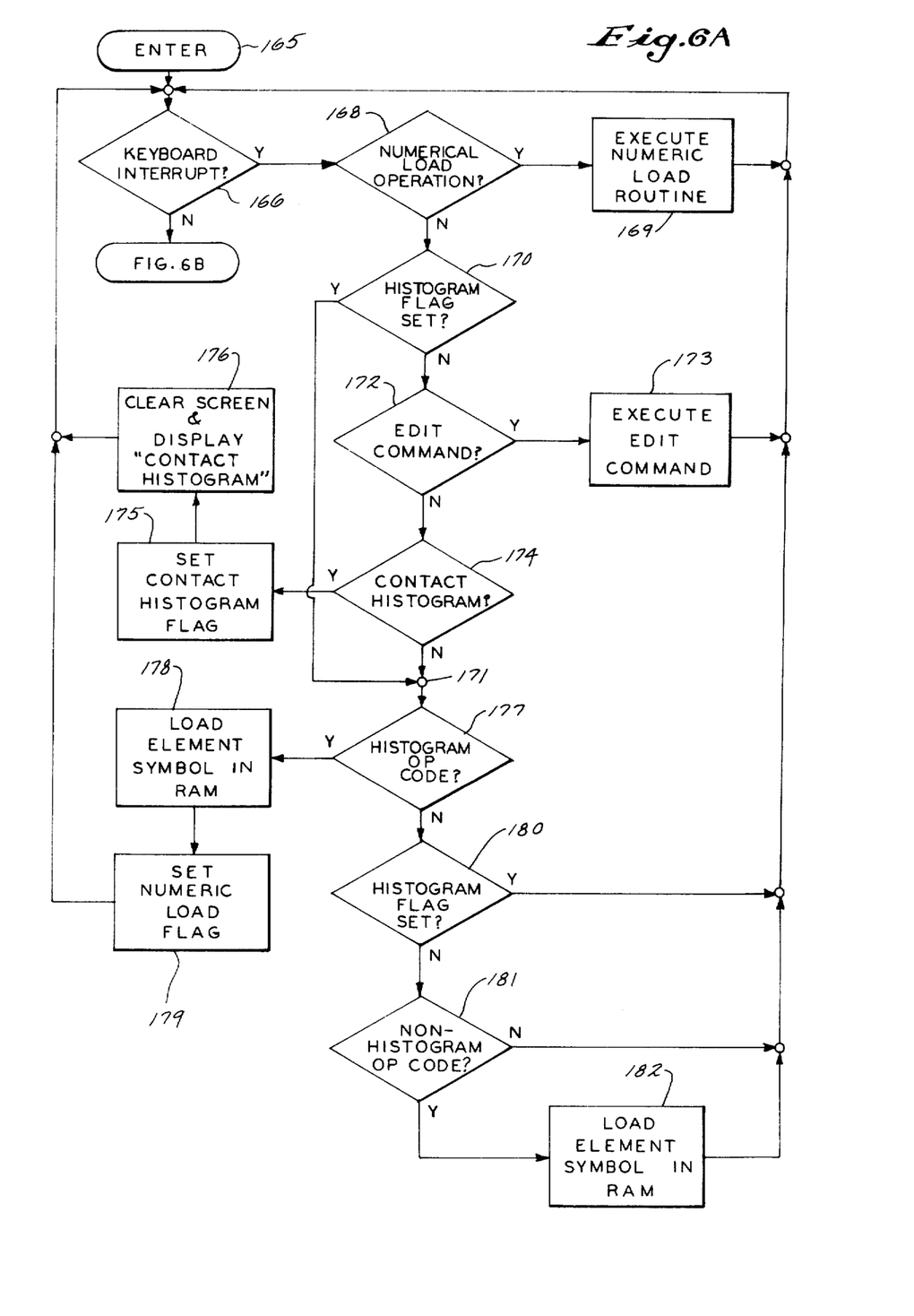
Figure 6B:
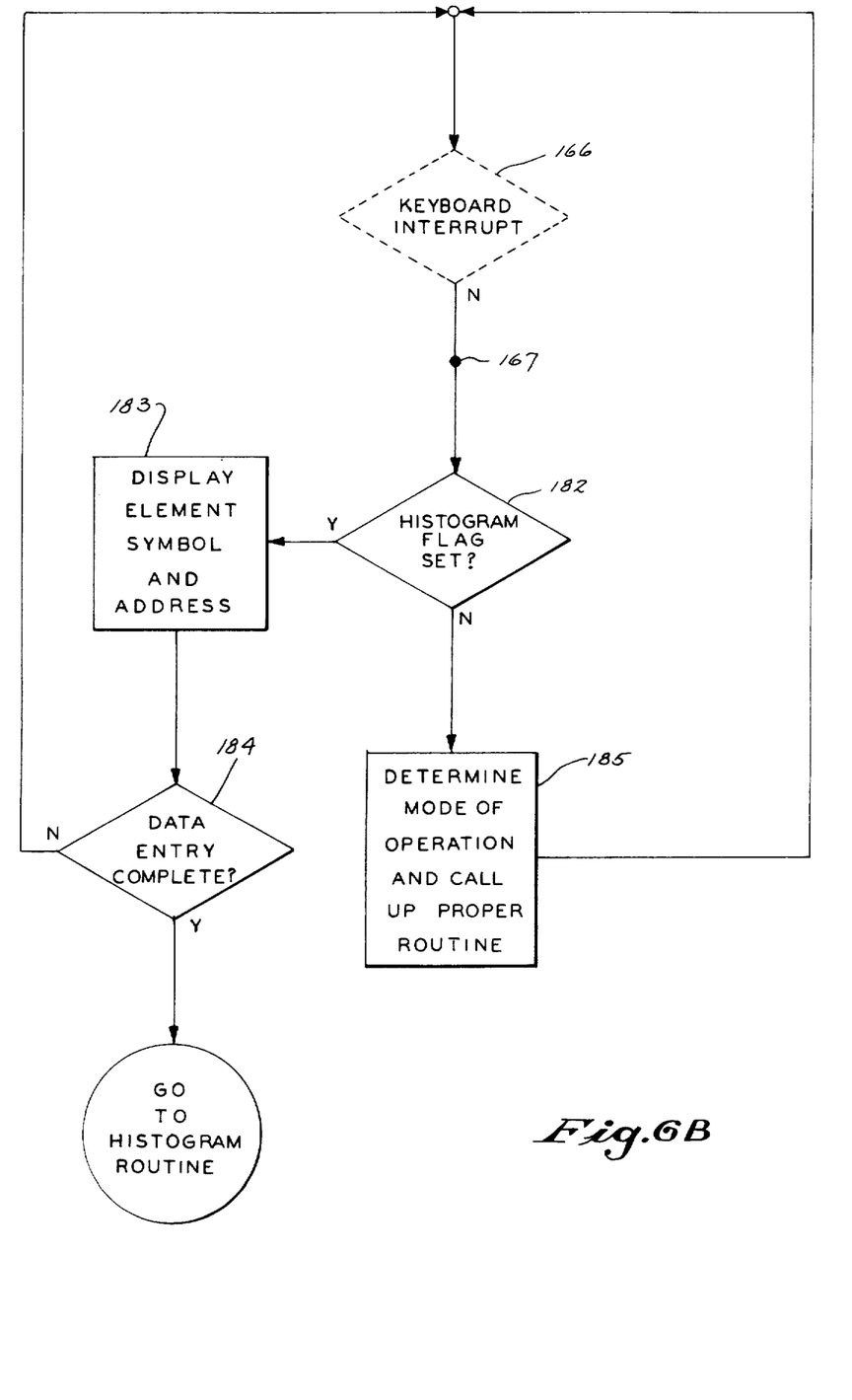

Referring to FIGS. 6a, and 6b, the controller program loader executive routine is entered at the point 165 and an initial determination is made as to whether an interrupt has been requested from the keyboard 77 (INP SUART) as indicated by the decision block 166. If no interrupt has been requested, the routine branches to the point 167 in FIG. 6b; otherwise, the routine proceeds through a series of instructions which determine the nature of the data received from the keyboard 77 and process that data accordingly. More spcifically, a determination is made as indicated by the decision block 168 as to whether the entered data is numerical data which identifies the I/O address of a previously indicated sensing device or operating device. If it is, a numeric load routine indicated by a process block 169 is executed to convert the received ASCII characters into a binary rack number and a binary slot number which are temporarily stored in the RAM 91.

If the keyboard interrupt is not a numeric character, a determination is next made as to whether the histogram flag is set. This is indicated by a decision block 170, and if it has been set, the routine branches to the point 171. Otherwise, a determination is made as to whether the interrupt is a command to execute an editing function such as load a program instruction into the controller memory, generate a gap in the stored controller program, delete a program instruction, search for a program instruction, etc. This determination is indicated by a decision block 172, and if an editing function is to be performed the appropriate subroutine is called up and executed as indicated generally by a process block 173.

As indicated by a decision block 174, if the keyboard interrupt is not an edit command, a determination is next made as to whether the contact histogram mode of operation is being selected. If so, a contact histogram flag is set as indicated by a process block 175 and the CRT display 80 is cleared and the words "Contact Histogram" displayed thereon as indicated by a process block 176. The contact histogram flag is stored on line ten of the RAM 91 and the ASCII characters for the words "Contact Histogram" are stored in the read-only memory 76.

If the contact histogram flag has been set to indicate that the mode has been selected, when the next keyboard interrupt occurs, the routine branches at the decision block 170 to the point 171; and a determination is made as to whether a valid contact histogram operation code has been entered by the operator. This determination is indicated by a decision block 177, and if a valid operation code has been entered, a corresponding symbol is stored as a set of ASCII characters on lines 13-17 of the RAM 91 as indicated by process block 178. A numeric load flag is also set as indicated by a process block 179 and this indicates that the next valid keyboard entry is the I/O address of the device to be monitored. This I/O address is stored on lines 7 and 8 of the RAM 91 by instructions indicated by the process block 169 which was discussed above.

If an operation code not associated with the contact histogram mode of operation is entered as determined by the decision block 177 and the histogram flag is set as determined by instructions indicated by a decision block 180, the executive routine branches back to the keyboard interrupt decision block 166 to await entry of a valid operation code. Although not pertinent to the present invention, if the controller program loader is in another mode of operation, as determined by the decision block 180, the keyboard entry is identified as an operation code not associated with the contact histogram by a decision block 181 and it is stored in the RAM 91 by instructions indicated by a process block 182.

The flow chart of FIG. 6a and the above description illustrate the manner in which information is entered through the keyboard 77 to establish whether the contact histogram mode of operation has been selected, and if so, to establish the identity of the I/O device which is to be monitored. Referring to FIG. 6b, between keyboard interrupts, the executive routine determines whether or not conditions are proper for entering the contact histogram routine. More specifically, if no keyboard interrupt is made when the executive routine executes the instruction indicated by the decision block 166, the routine branches to determine whether or not the contact histogram flag has been set as indicated by a decision block 182. If the contact histogram flag has been set, and the operation code which identifies the type of device to be monitored has been entered, the device symbol is displayed in the upper left hand corner of the CRT display 80 as at 164 in FIG. 8. This is accomplished by a set of instructions indicated by a process block 183 which couples the previously stored ASCII characters to the CRT display 80 from lines 13-17 of the RAM 91.

After the element symbol has been displayed, the executive routine remains in a loop defined by a decision block 184 until the five I/0 address characters for the selected element have been entered by the operator and stored in the RAM 91. Loading of the five I/O address characters in the RAM 91 is recorded by a numeric index which is stored on line nine of the RAM 91. Each time a keyboard interrupt is made and a numeric character is stored in the RAM 91, the numeric index is incremented. Instructions indicated by the decision block 184 examine the numeric index and when it equals five, the histogram routine to be described below is called up and executed.

Figure 8:
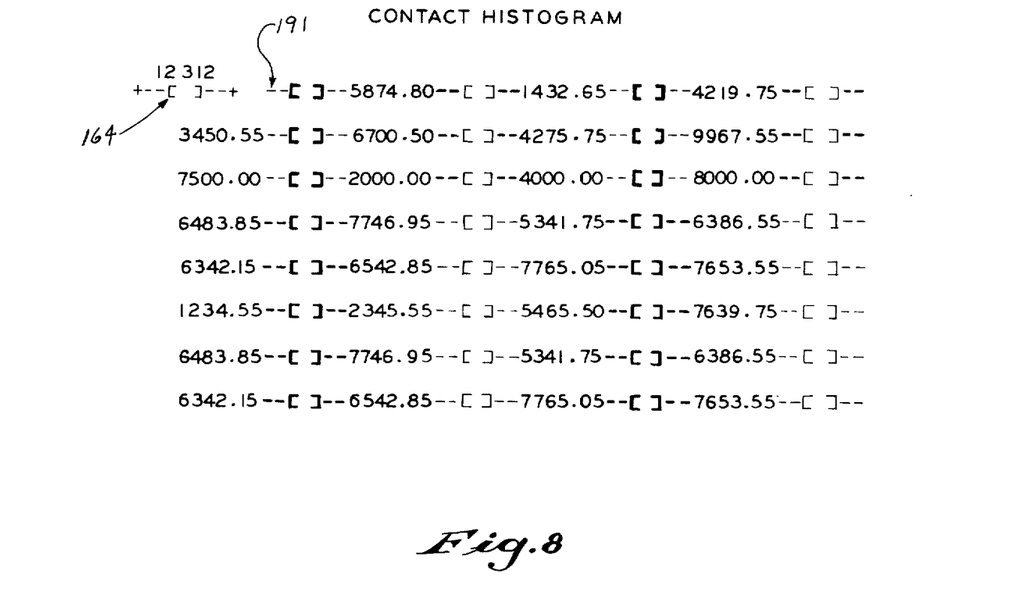
FIG. 8 is an exemplary display on the CRT screen of FIG. 2.

As shown in FIG. 8, the I/O address is displayed above the symbol of the device to be monitored. The first numeric indicates whethher the selected I/O device is a sensing device, an operating device, an internal timer, or an internal counter. The second numeric indicates the interface rack number of the selected I/0 device, the third numeric indicates the slot number to which the I/O device connects and the last two numerics indicate to which of the sixteen I/O circuits in the slot the selected I/O device is connected. Five zeros are displayed above the element symbol, and as each numeric is selected and stored in the RAM 91, it is displayed in place of one of the zeros.

Although the present invention relates to the contact histogram mode of operation of the controller program loader and, therefore, that aspect of the executive routine has been described in particular detail, the executive routine also performs a number of other functions. Among these other functions is the display, in ladder diagram format, of a control program on the CRT 80. If the controller program loader is not in the contact histogram mode of operation as determined by the decision block 182 in FIG. 6b, the selected mode of operation is determined and the appropriate CRT display routine is called up. This is indicated generally by a process block 185, which is exited back to the executive routine when the next keyboard interrupt occurs.

Figure 7A:
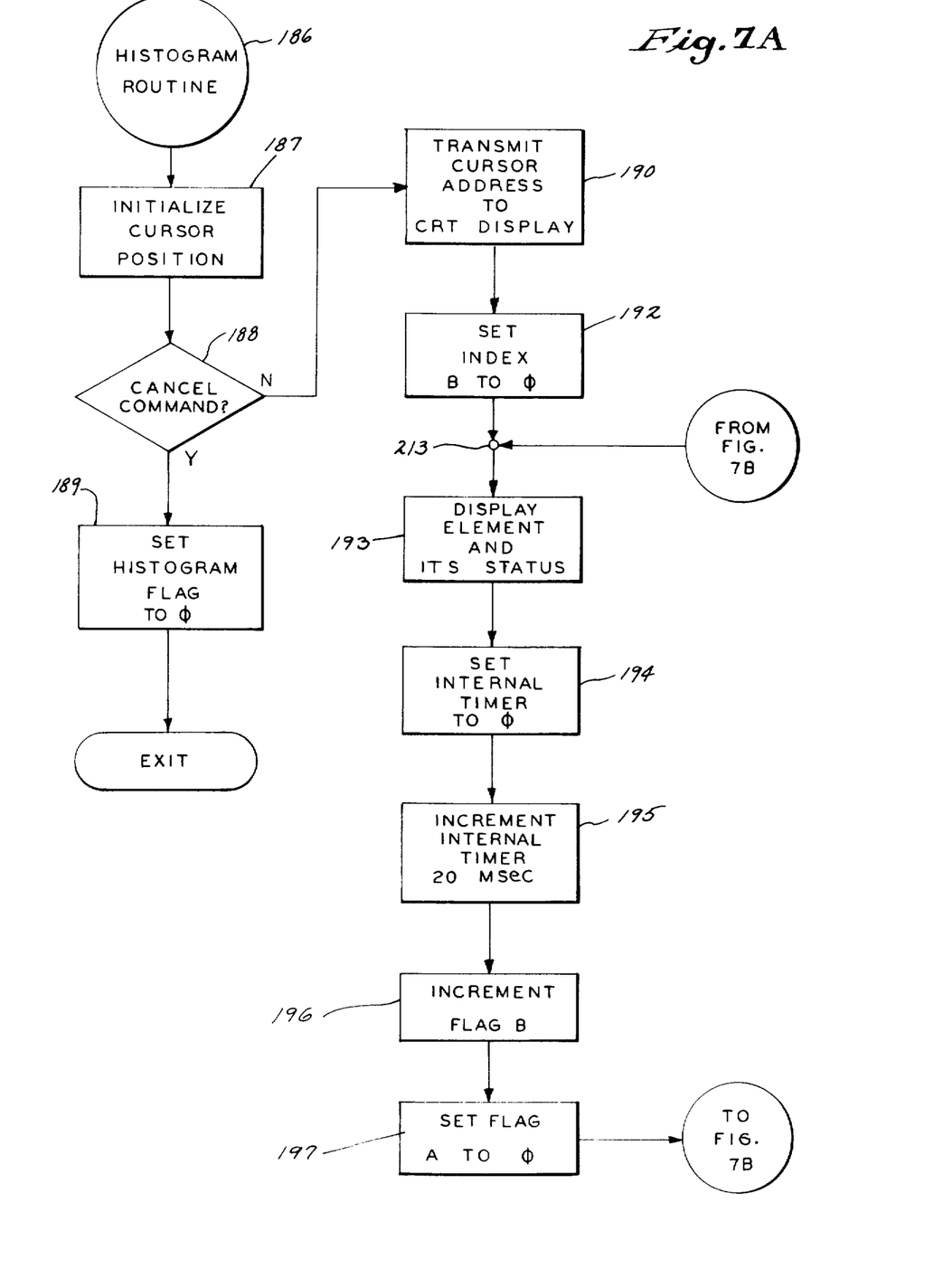
Figure 7B:
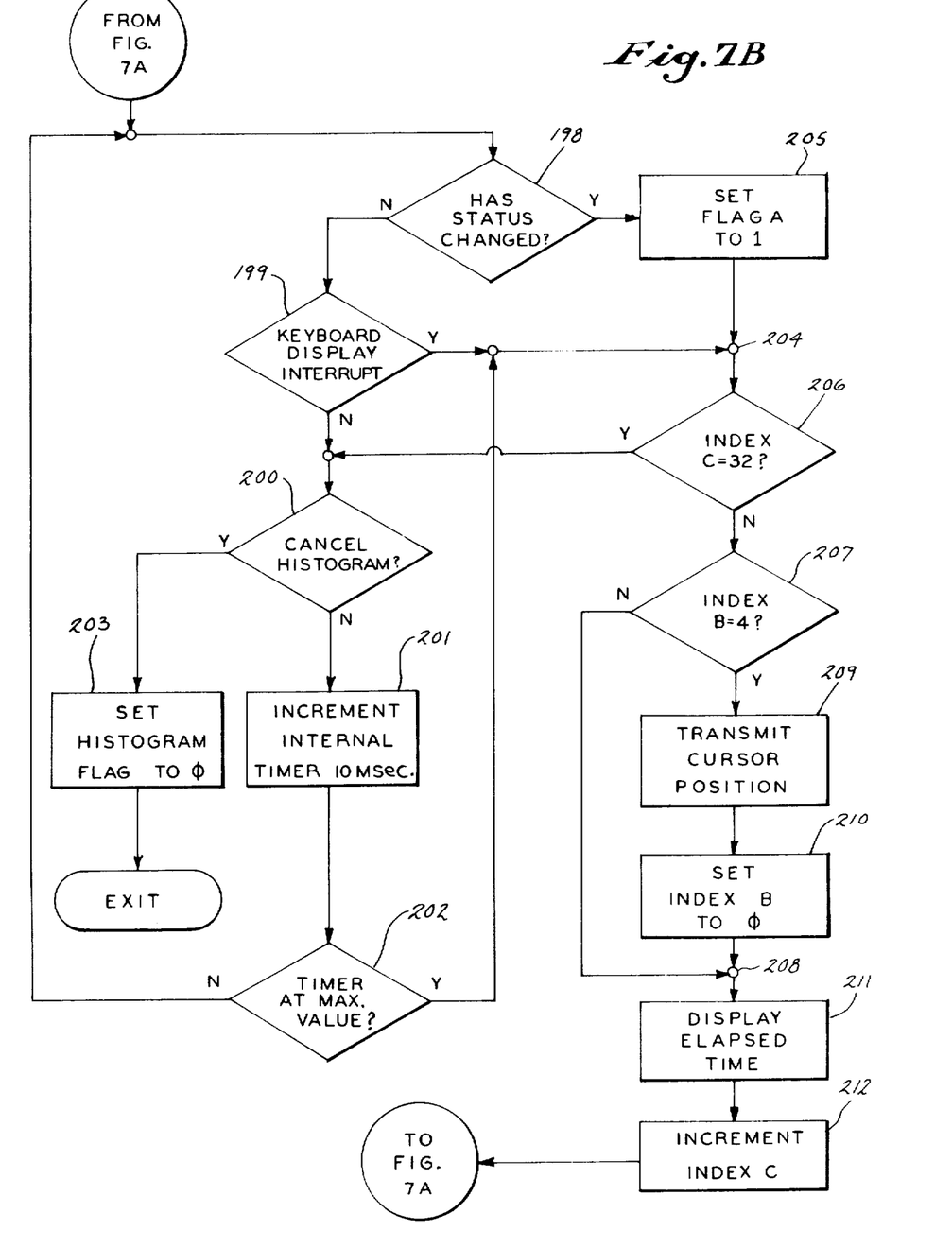

Referring to FIGS. 7a, 7b and 8, the executive routine calls up the histogram routine when the I/O device to be monitored has been fully identified and displayed on the CRT 80. The following information is stored in the RAM 91 during its execution.

| Line No. | Contents |
|---|---|
| 1 - 3 | Six binary coded decimal digits (xxxx.xx) which accumulate elapsed time between status changes. |
| 4 | Flag A, a one-bit word which indicates whether the I/O device has changed status. |
| 5 | Index B, a two-bit number which indicates the number (1-4) of elements currently displayed on a line of the CRT. |
| 6 | Index C, a five-bit number which indicates the total number (1-32) of elements displayed on the CRT. |
| 7 & 8 | Sixteen-bit I/O address of selected I/O device. |
| 9 | Three-bit numeric index which counts (1-5) the extent to which the I/O address has been entered. |
| 10 | One-bit contact histogram mode select flag. |
| 11 & 12 | Scratch pad. |
| 13 - 17 | Five ASCII characters which identify the type, or character, of the selected I/O device. |
| 18 & 19 | Sixteen-bit CRT cursor position pointer. |
| 20 | One-bit word which indicates present status of selected I/O device. |

The contact histogram routine is entered at the point 186 and its first function is to properly position the CRT cursor. This is accomplished by program instructions indicated by a process block 187 which set the 16-bit CRT cursor position pointer stored in the RAM 91 to a preselected value. As indicated by a decision block 188 it is then determined whether the contact histogram command has been cancelled by the operator. If so, the histogram flag is set zero as indicated by a process block 189 and routine is exited back to the executive routine. If not, the initial CRT cursor position identified by the sixteen-bit pointer is read out of a table stored in the read-only memory 76 to the CRT display terminal 78 as indicated by a process block 190. As shown in FIG. 8, this initial cursor position is near the upper left hand corner of the display at the point 191.

As shown in FIG. 8, the CRT display terminal 78 will display a maximum of eight lines of information with a maximum of four status change indications on each line. The index B stores the number of displayed status changes (1–4) on a line and is set to zero at the outset by instructions indicated by a process block 192. A set of instructions indicated by a process block 193 then couple the ASCII characters (in the example of FIG. 8, — []— )stored on lines 13–17 of the RAM 91 to the CRT display terminal 78. At the same time, the status of the selected I/O device which is stored on line 20 of the RAM 91 is coupled to the CRT display terminal 78 to control the intensity of the displayed character. For example, if a selected sensing device is open, or deenergized, the displayed character is at normal intensity whereas, if it is closed, or energized, the displayed character is intensified. In the example of FIG. 8, the sensing device is open and the character is displayed at normal intensity.

The internal timer stored on lines 1–3 of the RAM 91 is next set to zero as indicated by a process block 194, and it is immediately incremented two 10 msec. time increments as indicated by a process block 195. As shown by a process block 196, the B index line 5 of the RAM 91 is incremented one count to record that the selected I/O element and its status have been displayed once, and the A flag on line 4 of the RAM 91 is set to zero as indicated by a process block 197.

Referring particularly to FIG. 7b, a set of instructions indicated by a decision block 198 is executed next to determine whether or not the selected I/O device has changed logic state. These instructions and the manner in which the circuitry operates in response to them will be described in more detail hereinafter. If the status has not changed, the routine enters a timing loop of 10-millisecond duration which commences with instructions indicated by decision blocks 199 and 200 that determine whether there has been an interrupt initiated at the keyboard 77 or whether a command has been given to cancel the histogram mode of operation. If neither event has occurred, the accumulated elapsed time stored on lines 1–3 of the RAM 91 is incremented one ten-millisecond count as indicated by a process block 201 and the routine loops back to the decision block 198 through a decision block 202 which determines whether the internal timer has reached its maximum value of 9999.99 seconds.

The histogram routine remains in the ten-millisecond timing loop until any one of four events occurs. If the histogram routine is cancelled as determined by the decision block 200, the histogram flag is set to zero as indicated by a process block 203 and the routine is exited back to the executive routine. On the other hand, if either a keyboard interrupt occurs or the internal timer reaches its maximum value as determined by the respective decision blocks 199 and 202, the routine branches out of the timing loop to a point 204. Similarly, if a status change is indicated when the instructions which comprise the decision block 198 are executed, the routine branches to the point 204 through a set of instructions indicated by a process block 205 which set the A flag to 1.

Having branched to the point 204, subsequent instructions in the histogram routine analyze and increment the B and C indices and display the elapsed time. More specifically, the C index is examined by instructions indicated by a decision block 206 to determine whether the CRT screen is full. If the index C is equal to 32, the screen is full and the routine is returned to the timing loop to accumulate time. Otherwise, the B index is examined by instructions indicated by a decision block 207 to determine whether a line on the CRT screen is full. If not, the routine branches to a point 208. However, as indicated by process block 209, when a line is full a cursor position is read out of the read-only memory 76 by the pointer stored on lines 18 and 19 of the RAM 91 to start the next line. The B index is then reset to zero as indicated by a process block 219 and the routine then executes instructions indicated by process block 211 to display the six-decimal digit elapsed time stored on lines 1–3 of the RAM 91. The C index is then incremented one count as indicated by a process block 212 and the routine loops back to a point 213 as shown in FIG. 7a to display the element symbol and indicate its status as described above. The contact histogram continues to monitor the selected I/O device and display its state and the time between status changes until the screen is full.

The contact histogram routine thus periodically examines the status of the selected I/O device and concurrently accumulates elapsed time. When a status change occurs, the elapsed time is displayed on the CRT screen along with an indication of the present status of the I/O device. Whereas in the first embodiment of the invention the status of the selected I/O device is examined each time a controller program instruction directed to that device is executed, in the second preferred embodiment of the invention the controller program loader periodically interrupts the operation of the programmable controller processor and examines the status of the appropriate bit in the input or output image tables of the controller memory. The instructions which perform this function are indicated collectively by the decision block 198 in FIG. 7b and the program listing will now be described with particular reference to FIGS. 2 and 3 and the instruction set and microprocessor register designations fully disclosed in the above cited microprocessor Users Manual.

| Label | Operation | Operand | Comments |
|---|---|---|---|
| CHANG | LLI | STATA | Load RAM address of line 20 into the microprocessor L-register |
| | LEM | | Store the contents of line 20 in the microprocessor E-register |
| | LLI | ELMAI | Load RAM address of line 7 into the microprocessor L-register |
| | LCM | | Store the contents of line 7 in the microprocessor C-register |
| | INL | | Increment the microprocessor L-register to obtain the RAM address of line 8 |
| | LDM | | Store the contents of line 8 in the microprocessor D-register |
| | LAD | | Load the microprocessor accumulator with the I/O image able word address in register D |
| | OUT | PLCLA | Output the accumulator contents to the address latch 106 |

-continued

| Label | Operation | Operand | Comments |
|---|---|---|---|
| | LAI | 300B | Load the accumulator with zeros |
| | OUT | PLCHA | Output the accumulator contents to the second address latch 107. This action results in an interrupt of the programmable controller processor during which the addressed line of the input or output image table is read out and stored in the input data latches 126 and 127 |
| | LAC | | Load the bit-pointer stored in the C-register into the accumulator |
| | NDI | 7B | Mask out the upper five bits to leave only the lower three bits of the four-bit pointer |
| | LBA | | Store the accumulator contents in the B register |
| | LAC | | Load the bit-pointer information in the C-register into the accumulator again |
| | NDI | 10B | Mask out all bits except the most significant bit of the bit pointer |
| | JFZ | CHAD1 | If the accumulator is not zero, jump to CHAD1 address. This result indicates that the desired status bit is stored in upper eight-bit byte stored in input data latch 127 |
| | INP | PLCLI | Input the lower eight-bit byte of status data stored in input data latch 126 |
| | JMP | CHAD2 | Go to final portion of the subroutine |
| CHAD1 | INP | PLCHI | Input the upper eight-bit byte of status data stored in the input data latch 127 |
| CHAD2 | RRC | | Rotate accumulator contents right one bit placing bit $A_o$ into carry flip-flop |
| | DCB | | Decrement the B-register one count |
| | JFS | CHAD2 | If B-register is zero go to next instruction, otherwise go back to CHAD2 to continue rotation |
| | JTC | CHAD4 | If bit under examination in accumulator is 1 then jump to CHAD4 |
| | LBI | φ | If carry bit in accumulator is zero, set B-register to zero |
| | JMP | CHAD3 | Jump to CHAD3. |
| CHAD4 | LBI | 1 | If carry bit in accumulator is one, set B-register to one |
| CHAD3 | LAE | | Load contents of E-register into accumulator |
| | NDI | 17B | Mask out the upper four bits in the accumulator to leave "previous" status bit |
| | CPB | | Compare "previous" status bit in accumulator with "present" status bit in B-register |
| | JTZ | 199 | If compared status bits are the same jump to process block 199 in FIG. 7b. Otherwise execute next instruction |
| | LLI | STATA | LoAD RAM address of line 20 into the L-register |
| | LMB | | Load "present" status bit in B-register into line 20 of RAM 91 |
| | JMP | 205 | Continue on to instructions indicated by process block 205 in FIG. 7b |

Two preferred embodiments of the invention have been described for use with two types of commercially available programmable controllers. It should be apparent, however, that the invention may be embodied in other forms when applied to different types of programmable controllers and reference is, therefore, made to the following claims for interpreting the breadth of the invention.

We claim:

1. In a controller having a processor which operates in response to control program instructions stored in a controller memory to periodically examine the status of a plurality of input devices on a machine to be controlled, the improvement therein of a contact histogram which provides a visual record of the status of a selected one of said input devices and which comprises:

means for storing the I/O address of a selected input device to be monitored;

means connected to said storing means and said controller for comparing said stored I/O address with an I/O address in each program instruction executed by said controller, said comparing means generating a selected logic signal when they are identical;

means connected to said controller and said comparing means for storing a signal indicative of the status of said selected input device when said selected logic signal is generated by said comparing means;

timer means for accumulating elapsed time between status changes of said selected input device and recording the same when enabled; and means connected to said status storing means for enabling said timer means when the stored status of said selected input device changes status.

2. The improvement as recited in claim 1 which said controller includes a logic input bus which couples to the input devices connected to said controller and which indicates the status of one of said input devices when a program instruction containing its associated I/O address is executed by the controller and wherein said status storing means is a flip-flop having an input connected to said logic input bus.

3. The improvement as recited in claim 1 in which said timer means includes a counter which accumulates and stores elapsed time, recording means connected to said enabling means and connected to the counter to provide a visual indication of the elapsed time when enabled, and reset means connected to said enabling means and said counter to reset said counter to zero after each visual indication of elapsed time.

4. In a programmable controller having a processor which operates in response to control program instructions stored in a controller memory to periodically examine the status of a plurality of input devices on a machine to be controlled, the improvement therein of a contact histogram which provides a visual record of the status of a selected one of said input devices and which comprises:

means connected to said controller for periodically examining the status of a selected input device to be monitored;

means for storing the status of an examined input device;

means for accumulating elapsed time between changes in status of said selected input device and recording the same when enabled; and means connected to said status storing means for enabling said recording means when the stored status of said selected input device changes status.

5. The improvement as recited in claim 4 which includes means for resetting said timer means to zero after each recording of the elapsed time.

6. The improvement as recited in claim 4 in which the status of each input device connected to said controller is stored as a status bit in said controller memory, said contact histogram includes means for storing the controller memory address of the status bit for the input device to be monitored, and said examining means includes means for coupling the stored controller memory address to said controller memory and means for reading the status bit of said input device out of the controller memory.

7. The improvement as recited in claim 6 in which said enabling means includes means for comparing the status of said input device stored in said status storing means with the status bit of said input device which is read out of said controller memory.

8. The improvement as recited in claim 6 in which the status of a plurality of input devices are stored at each of said controller memory addresses and said examining means includes means for storing a bit pointer and means responsive to the stored bit pointer for selecting the status bit corresponding to said input device to be monitored from a plurality of status bits read from said controller memory.

9. The improvement as recited in claim 4 in which said means for recording elapsed time includes a CRT display which displays the elapsed time between status changes, and which includes means for coupling the status of said selected input device to said CRT display for providing a visual indication of said status when enabled.

10. In a programmable controller having a processor which operates in response to control program instructions stored in a controller memory to periodically examine the status of a plurality of input devices on a machine to be controlled, the improvement therein of a contact histogram which provides a visual record of the status of a selected one of said input devices and which comrises:

means coupled to said processor for manually selecting the input device;

means coupled to said processor for storing the status of the selected input device;

means coupled to said status storing means for detecting a change in the status of said selected input device from one state to another;

timer means coupled to said detecting means and being operable in response to a detected change in the status of said selected input device to commence accumulating elapsed time from the status change event; and recording means coupled to said timer means and being operable to visually display the elapsed time between status change events.

11. The improvement as recited in claim 10 in which said recording means is also coupled to said status storage means and is operable to visually record the status of said selected input device after each status change event.

12. The improvement as recited in claim 11 in which said recording means is a cathode ray tube, said visual record of the status of said selected input device is a series of symbols on its screen which mark each status change event and which indicate the status of the selected input device after each such event, and said visual display of the elapsed time between status change events is a series of numbers on the cathode ray tube screen, each of which is interposed between the respective symbols which mark the beginning and end of the elapsed time period which the number represents.

* * * * *